United States Patent
Zhan et al.

(10) Patent No.: US 11,004,234 B2
(45) Date of Patent: May 11, 2021

(54) METHOD AND APPARATUS FOR ANNOTATING POINT CLOUD DATA

(71) Applicant: BEIJING BAIDU NETCOM SCIENCE AND TECHNOLOGY CO., LTD., Beijing (CN)

(72) Inventors: Jun Zhan, Beijing (CN); Houchang Lv, Beijing (CN); Xu Han, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 204 days.

(21) Appl. No.: 15/410,704

(22) Filed: Jan. 19, 2017

(65) Prior Publication Data

US 2018/0108146 A1 Apr. 19, 2018

(30) Foreign Application Priority Data

Oct. 13, 2016 (CN) .......................... 201610892503.3

(51) Int. Cl.
*G06T 7/73* (2017.01)
*G06K 9/46* (2006.01)
*G06K 9/00* (2006.01)
(Continued)

(52) U.S. Cl.
CPC .............. *G06T 7/73* (2017.01); *G01S 7/4808* (2013.01); *G01S 17/66* (2013.01); *G01S 17/86* (2020.01);
(Continued)

(58) Field of Classification Search
CPC ... G06T 7/73; G06T 7/246; G06T 7/11; G06T 2207/10004; G06T 2207/10016;
(Continued)

(56) References Cited

U.S. PATENT DOCUMENTS 8,442,307 B1 * 5/2013 Anati ....................... G06T 7/73
382/154
9,679,227 B2 * 6/2017 Taylor .................. G06K 9/6292
(Continued)

FOREIGN PATENT DOCUMENTS

| CN | 110264468 A | * | 9/2019 |
| JP | 2001-208840 A | | 8/2001 |
| JP | 2003196590 A | | 7/2003 |
| JP | 2008008679 A | | 1/2008 |
| JP | 2011505610 A | | 2/2011 |
| JP | 2011232155 A | | 11/2011 |

OTHER PUBLICATIONS

Office Action issued in Japanese Patent Application No. 2017-106563, dated Sep. 18, 2018.

*Primary Examiner* — Pinalben Patel
(74) *Attorney, Agent, or Firm* — Marshall, Gerstein & Borun LLP

(57) ABSTRACT

The present application discloses a method and apparatus for annotating point cloud data. A specific implementation of the method includes: collecting data in a given scenario by using a laser radar and a non-laser radar sensor to respectively obtain point cloud data and sensor data; segmenting and tracking the point cloud data to obtain point cloud segmentation and tracking results; recognizing and tracking feature objects in the sensor data to obtain feature object recognition and tracking results; correcting the point cloud segmentation and tracking results by using the feature object recognition and tracking results, to obtain confidence levels of the point cloud recognition and tracking results; and determining a point cloud segmentation and tracking result whose confidence level is greater than a confidence level threshold as a point cloud annotation result. This implementation reduces the amount of manual work required for annotating point cloud data, thereby reducing the annotation costs.

12 Claims, 4 Drawing Sheets

(51) Int. Cl.
*G01S 7/48* (2006.01)
*G01S 17/86* (2020.01)
*G01S 17/931* (2020.01)
*G06T 7/246* (2017.01)
*G01S 17/66* (2006.01)
*G06T 7/11* (2017.01)

(52) U.S. Cl.
CPC ........ *G01S 17/931* (2020.01); *G06K 9/00664* (2013.01); *G06K 9/00805* (2013.01); *G06K 9/46* (2013.01); *G06K 9/4604* (2013.01); *G06T 7/246* (2017.01); *G06K 9/00228* (2013.01); *G06T 7/11* (2017.01); *G06T 2207/10004* (2013.01); *G06T 2207/10016* (2013.01)

(58) Field of Classification Search
CPC ....... G01S 7/023; G01S 17/66; G06K 9/4604; G06K 9/00228
See application file for complete search history.

(56) References Cited

U.S. PATENT DOCUMENTS

| 9,915,947 | B1* | 3/2018 | LaForge | G05D 1/0278 |
| 2005/0125154 | A1 | 6/2005 | Kawasaki | |
| 2007/0286475 | A1 | 12/2007 | Sekiguchi | |
| 2010/0296705 | A1* | 11/2010 | Miksa | G01C 11/02 382/106 |
| 2011/0260909 | A1 | 10/2011 | Ogawa et al. | |
| 2013/0293532 | A1* | 11/2013 | Vaddadi | G06T 15/005 345/419 |
| 2014/0307247 | A1* | 10/2014 | Zhu | G01S 17/023 356/4.01 |
| 2015/0084951 | A1* | 3/2015 | Boivin | G06T 19/006 345/419 |
| 2019/0287297 | A1* | 9/2019 | Abhiram | G06T 7/246 |

* cited by examiner

METHOD AND APPARATUS FOR ANNOTATING POINT CLOUD DATA

CROSS-REFERENCE TO RELATED APPLICATION

This application is related to and claims priority from Chinese Application No. 201610892503.3, filed on Oct. 13, 2016, the entire disclosure of which is hereby incorporated by reference.

TECHNICAL FIELD

The present application relates to the field of computer technology, specifically to the field of point cloud data processing technology, and more specifically to a method and apparatus for annotating point cloud data.

BACKGROUND

When a recognition algorithm involving point cloud data is trained, a large amount of annotated point cloud data needs to be used as training samples so as to optimize an obstacle recognition algorithm. Therefore, a large amount of point cloud data in different scenarios needs to be collected and accurately annotated in advance, in order to ensure that the optimization process can be smoothly performed.

However, due to the insufficient density of point cloud data and the change in angle during the collection of point cloud data, it is rather difficult and time-consuming for annotation personnel to perform point cloud annotation, and the accuracy of annotation is undesirable. Therefore, it is necessary to improve the efficiency of annotating point cloud data.

SUMMARY

An objective of the present application is to provide an improved method and apparatus for annotating point cloud data, so as to solve the technical problems mentioned in the Background.

According to a first aspect, the present application provides a method for annotating point cloud data, comprising: collecting data in a given scenario by using a laser radar and a non-laser radar sensor to respectively obtain point cloud data and sensor data; segmenting and tracking the point cloud data to obtain point cloud segmentation and tracking results; recognizing and tracking feature objects in the sensor data to obtain feature object recognition and tracking results; correcting the point cloud segmentation and tracking results by using the feature object recognition and tracking results, to obtain confidence levels of the point cloud recognition and tracking results; and determining a point cloud segmentation and tracking result whose confidence level is greater than a confidence level threshold as a point cloud annotation result.

In some embodiments, after the obtain confidence levels of the point cloud recognition and tracking results, the method further comprises: acquiring a point cloud segmentation and tracking result whose confidence level is greater than the confidence level threshold, for checking by a user; and acquiring the checked point cloud segmentation and tracking result in response to a check operation from the user on the point cloud segmentation and tracking result whose confidence level is greater than the confidence level threshold; and the determining a point cloud segmentation and tracking result whose confidence level is greater than a confidence level threshold as a point cloud annotation result comprises: determining the checked point cloud segmentation and tracking result as the point cloud annotation result.

In some embodiments, the collecting data in a given scenario by using a laser radar and a non-laser radar sensor to respectively obtain point cloud data and sensor data comprises: collecting the data in the scenario by using a camera, to obtain a video.

In some embodiments, the recognizing and tracking feature objects in the sensor data to obtain feature object recognition and tracking results comprises: executing a vehicle registration plate recognizing and tracking algorithm and/or a human face recognizing and tracking algorithm on video content of the video.

In some embodiments, the collecting data in a given scenario by using a laser radar and a non-laser radar sensor to respectively obtain point cloud data and sensor data comprises: collecting data by using a laser radar and a sensor placed at the same heights as those mounted on a driverless vehicle.

In some embodiments, the collecting data in a given scenario by using a laser radar and a non-laser radar sensor to respectively obtain point cloud data and sensor data comprises: collecting data by using a laser radar and a sensor mounted and calibrated on a driverless vehicle.

According to a second aspect, the present application provides an apparatus for annotating point cloud data, comprising: a collecting unit configured to collect data in a given scenario by using a laser radar and a non-laser radar sensor to respectively obtain point cloud data and sensor data; a segmentation and tracking unit configured to segment and track the point cloud data to obtain point cloud segmentation and tracking results; a recognition and tracking unit configured to recognize and track feature objects in the sensor data to obtain feature object recognition and tracking results; a correction unit configured to correct the point cloud segmentation and tracking results by using the feature object recognition and tracking results, to obtain confidence levels of the point cloud recognition and tracking results; and a determining unit configured to determine a point cloud segmentation and tracking result whose confidence level is greater than a confidence level threshold as a point cloud annotation result.

In some embodiments, the apparatus further comprises an acquiring unit configured to: acquire a point cloud segmentation and tracking result whose confidence level is greater than the confidence level threshold, for checking by a user; and acquire the checked point cloud segmentation and tracking result in response to a check operation from the user on the point cloud segmentation and tracking result whose confidence level is greater than the confidence level threshold; and the determining unit is further configured to determine the checked point cloud segmentation and tracking result as the point cloud annotation result.

In some embodiments, the collecting unit is further configured to: collect the data in the scenario by using a camera, to obtain a video.

In some embodiments, the recognition and tracking unit is further configured to: execute a vehicle registration plate recognizing and tracking algorithm and/or a human face recognizing and tracking algorithm on video content of the video.

In some embodiments, the collecting unit is further configured to: collect data by using a laser radar and a sensor placed at the same heights as those mounted on a driverless vehicle.

In some embodiments, the collecting unit is further configured to: collect data by using a laser radar and a sensor mounted and calibrated on a driverless vehicle.

According to the method and apparatus for annotating point cloud data provided in the present application, segmentation and tracking results of a point cloud are corrected by using feature object recognition and tracking results that are obtained through recognition and tracking of other sensor data, and a final point cloud annotation result is screened out according to confidence levels that are obtained after the correction. Whereby, the amount of manual work required for annotating point cloud data is reduced, thereby reducing the annotation costs.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
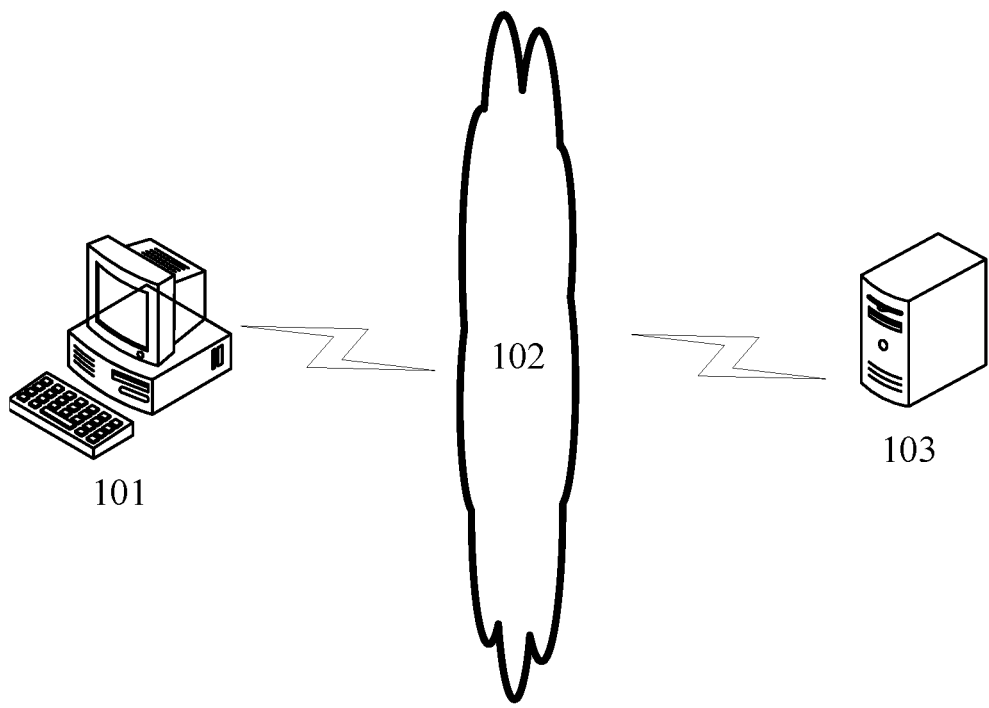
FIG. 1 is a diagram illustrating an exemplary system architecture to which the present application can be applied.

FIG. 1 shows an exemplary system architecture 100 to which a method or apparatus method for annotating point cloud data according to an embodiment of the present application can be applied.

As shown in FIG. 1, the system architecture 100 may include a terminal device 101, a network 102, and a server 103. The network 102 is a medium for providing a communication link between the terminal device 101 and the server 103. The network 102 may include various connection types, such as wired and wireless communication links or optical fiber cables.

A user may use the terminal device 101 to interact with the server 103 through the network 102 to receive or send a message or the like. Various communication client applications such as a point cloud visualization tool may be installed on the terminal device 101.

The terminal device 101 may be various electronic devices having a display screen and supporting running of the point cloud visualization tool, including, but not limited to, a portable laptop computer, a desktop computer, and so on.

The server 103 may be a server providing various services, for example, a back-end server providing support for information displayed on the terminal device 101. The back-end server may analyze or otherwise process received data, and feed back the processing result to the terminal device.

It should be noted that the method for annotating point cloud data that is provided in this embodiment of the present application may be executed by the terminal device 101, or may be executed by the server 103; alternatively, different steps in the method may be respectively executed by the terminal device 101 and the server 103. Correspondingly, the apparatus for annotating point cloud data may be disposed in the terminal 101, or may be disposed in the server 103; alternatively, different units of the apparatus may be disposed in the terminal 101 and the server 103.

It should be appreciated that the number of terminal devices, the number of networks, and the number of servers in FIG. 1 are merely exemplary. Any number of terminal devices, networks, and servers may be set according to implementation requirements.

Figure 2:
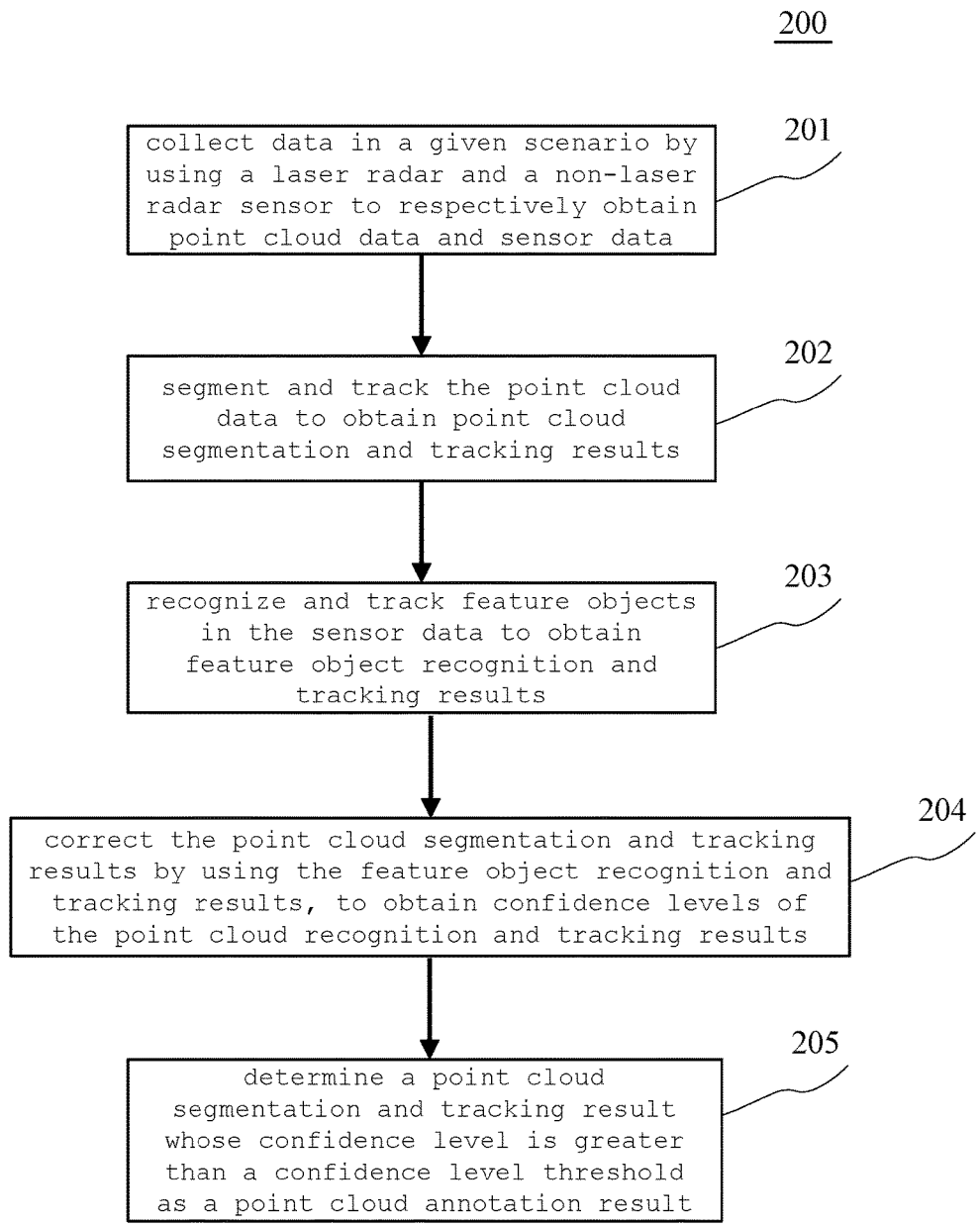
FIG. 2 is a flow chart of a method for annotating point cloud data according to an embodiment of the present application.

Further, referring to FIG. 2, FIG. 2 shows a flow 200 of a method for annotating point cloud data according to an embodiment of the present application. The method for annotating point cloud data includes the following steps.

Step 201, collect data in a given scenario by using a laser radar and a non-laser radar sensor to respectively obtain point cloud data and sensor data.

In this embodiment, an electronic device (for example, the terminal device or the server shown in FIG. 1) on which the method for annotating point cloud data is run may perform data collection in a same scenario by using a laser radar and a sensor different from the laser radar. Point cloud data may be obtained by using the laser radar, and sensor data different from the point cloud data may be obtained by using the sensor different from the laser radar.

Step 202, segment and track the point cloud data to obtain point cloud segmentation and tracking results.

In this embodiment, based on the point cloud data obtained in step 201, the electronic device may perform a segmentation and tracking operation on the point cloud data, to obtain point cloud segmentation and tracking results. The point cloud segmentation and tracking operation may be implemented by using an existing point cloud segmentation and tracking result algorithm, and will not be repeatedly described here.

Step 203, recognize and track feature objects in the sensor data to obtain feature object recognition and tracking results.

In this embodiment, based on the sensor data obtained in step 201, the electronic device may perform recognition and tracking of feature objects in the sensor data to obtain feature object recognition and tracking results.

Step 204, correct the point cloud segmentation and tracking results by using the feature object recognition and tracking results, to obtain confidence levels of the point cloud recognition and tracking results.

In this embodiment, based on the feature object recognition and tracking results obtained in step 203 and the point cloud segmentation and tracking results obtained in step 202, the electronic device may correct the point cloud segmentation and tracking results by using the feature object recognition and tracking results, so as to obtain confidence levels of the point cloud segmentation and tracking results. The correction process is to determine whether the point cloud segmentation and tracking result matches the feature object recognition and tracking result and determine the matching degree between them. For example, if an object is identified as a pedestrian in the point cloud segmentation and tracking result, and is also identified as a pedestrian in the feature object recognition and tracking result, the identification results of this object in the point cloud segmentation and tracking result and the feature object recognition and tracking result match each other; if an object is identified as a pedestrian in the point cloud segmentation and tracking result, and is identified as a vehicle in the feature object recognition and tracking result, the identification results of this object in the point cloud segmentation and tracking result and the feature object recognition and tracking result do not match.

Step 205, determine a point cloud segmentation and tracking result whose confidence level is greater than a confidence level threshold as a point cloud annotation result.

In this embodiment, the electronic device may compare the confidence levels obtained in step 204 with a preset confidence level threshold, and determine a point cloud segmentation and tracking result of which the confidence level is greater than the confidence level threshold as a point cloud annotation result.

In some alternative implementations of this embodiment, step 201 may include: collecting the data in the scenario by using a camera, to obtain a video. In this implementation, the sensor different from the laser radar is a camera, and correspondingly the sensor data for feature object recognition is a video.

In some alternative implementations of the previous implementation, step 203 may include: executing a vehicle registration plate recognizing and tracking algorithm and/or a human face recognizing and tracking algorithm on video content of the video. In this implementation, the electronic device may perform recognition and tracking of feature objects in video content of the video by using a vehicle registration plate recognition and tracking algorithm and/or a human face recognition and tracking algorithm, providing a criterion for subsequently evaluating the confidence level of the point cloud segmentation and tracking result. Because the vehicle registration plate recognition and tracking algorithm and the human face recognition and tracking algorithm are currently mature technologies, using either or both of the two recognition algorithms can improve the accuracy of feature object recognition and tracking, so that more reliable confidence levels can be obtained in subsequent steps, thereby obtaining a more accurate annotation result.

In some alternative implementations of this embodiment, the correcting the point cloud segmentation and tracking results by using the feature object recognition and tracking results in the above-mentioned step 204 may include: adjusting 3D point cloud space coordinates to be consistent with those in a space coordinates system of the camera, so that a point observed through the camera can match a point on the laser radar; and then determining whether an object and a movement trajectory of the object in the point cloud segmentation and tracking result match an object and a movement trajectory of the object in the feature object recognition and tracking result obtained for the video content and determining the matching degree between them. The obtained matching degree may be output as the confidence level.

In some alternative implementations of this embodiment, step 201 may include: collecting data by using a laser radar and a sensor placed at the same heights as those mounted on a driverless vehicle. In this implementation, data collection may be performed by using a laser radar and a sensor that are placed at the same heights as those mounted on a driverless vehicle, so that the collected data is as close as possible to data collected during actual driving of the driverless vehicle, thereby obtaining a more suitable obstacle recognition algorithm for the driverless vehicle through training by using the final annotation result.

In some alternative implementations of this embodiment, step 201 may include: collecting data by using a laser radar and a sensor mounted and calibrated on a driverless vehicle. In this implementation, in the above-mentioned step 201, data collection may be performed by using a laser radar and a sensor that have been mounted and calibrated on a driverless vehicle. In this implementation, vehicle-mounted devices on the driverless vehicle are directly used as data collecting devices, so that the collected data is as close as possible to data collected during actual driving of the driverless vehicle, thereby obtaining a more suitable obstacle recognition algorithm for the driverless vehicle through training by using the final annotation result.

According to the method provided in the above-mentioned embodiment of the present application, segmentation and tracking results of a point cloud are corrected by using feature object recognition and tracking results that are obtained through recognition and tracking of other sensor data, and a final point cloud annotation result is screened out according to confidence levels that are obtained after the correction. Whereby, the amount of manual work required for annotating point cloud data is reduced, thereby reducing the annotation costs.

Figure 3:
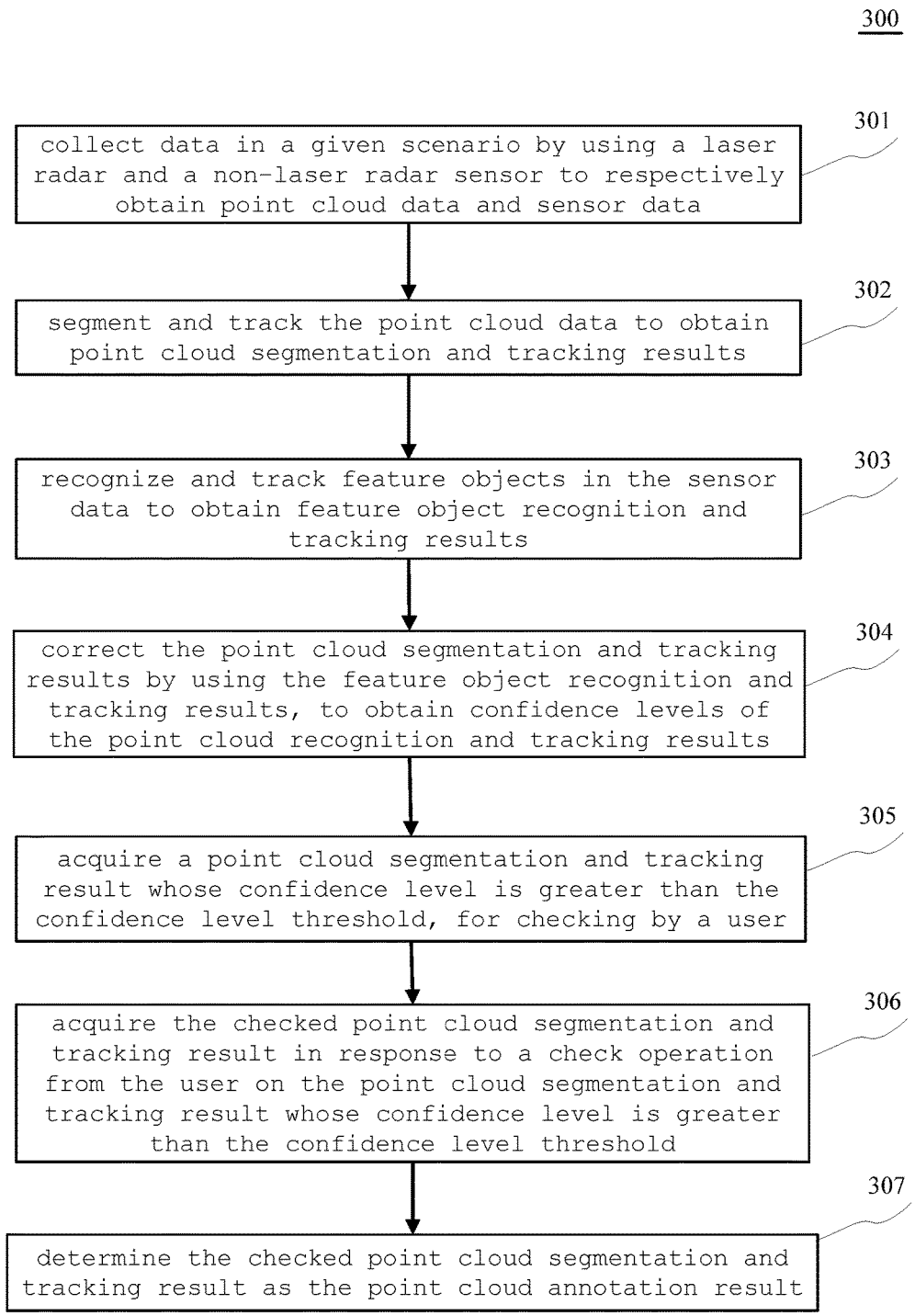
FIG. 3 is a flow chart of a method for annotating point cloud data according to another embodiment of the present application.

Further, referring to FIG. 3, FIG. 3 shows a flow 300 of a method for annotating point cloud data according to another embodiment. The flow 300 of the method for annotating point cloud data includes the following steps.

Step 301, collect data in a given scenario by using a laser radar and a non-laser radar sensor to respectively obtain point cloud data and sensor data.

In this embodiment, specific implementation of step 301 can be referred to step 201 in the embodiment corresponding to FIG. 2, and will not be repeatedly described here.

Step 302, segment and track the point cloud data to obtain point cloud segmentation and tracking results.

In this embodiment, specific implementation of step 302 can be referred to step 202 in the embodiment corresponding to FIG. 2, and will not be repeatedly described here.

Step 303, recognize and track feature objects in the sensor data to obtain feature object recognition and tracking results.

In this embodiment, specific implementation of step 303 can be referred to step 203 in the embodiment corresponding to FIG. 2, and will not be repeatedly described here.

Step 304, correct the point cloud segmentation and tracking results by using the feature object recognition and tracking results, to obtain confidence levels of the point cloud recognition and tracking results.

In this embodiment, specific implementation of step 304 can be referred to step 204 in the embodiment corresponding to FIG. 2, and will not be repeatedly described here.

Step 305, acquire a point cloud segmentation and tracking result whose confidence level is greater than the confidence level threshold, for checking by a user.

In this embodiment, based on the confidence levels obtained in step 304, the electronic device may select a point cloud segmentation and tracking result of which the confidence level is greater than the confidence level threshold, and provide the selected point cloud segmentation and tracking result for checking by a user.

Step 306, acquire the checked point cloud segmentation and tracking result in response to a check operation from the user on the point cloud segmentation and tracking result whose confidence level is greater than the confidence level threshold.

In this embodiment, based on the point cloud segmentation and tracking result of which the confidence level is greater than the confidence level threshold that is obtained in step 305, the electronic device, after detecting a check operation performed by the user on the point cloud segmentation and tracking result, may obtain the checked point cloud segmentation and tracking result.

In some alternative implementations of this embodiment, the check operation may be a manual spot check performed by the user on the point cloud segmentation and tracking result. In practice, the point cloud segmentation and tracking result of which the confidence level is greater than the confidence level threshold may be presented to the user for spot check. If the spot check is passed, the point cloud segmentation and tracking result can be used in subsequent steps.

Step 307, determine the checked point cloud segmentation and tracking result as the point cloud annotation result.

In this embodiment, based on the checked point cloud segmentation and tracking result obtained in step 306, the above-mentioned electronic device may determine the checked point cloud segmentation and tracking result as a final point cloud annotation result.

As can be seen from FIG. 3, compared with the embodiment corresponding to FIG. 2, the flow 300 of the method for annotating point cloud data in this embodiment highlights the check operation on the point cloud segmentation and tracking result of which the confidence level is greater than the confidence level threshold. Whereby, a more accurate annotation result can be obtained, and a better point cloud recognition algorithm can be obtained through training by using the annotation result.

Figure 4:
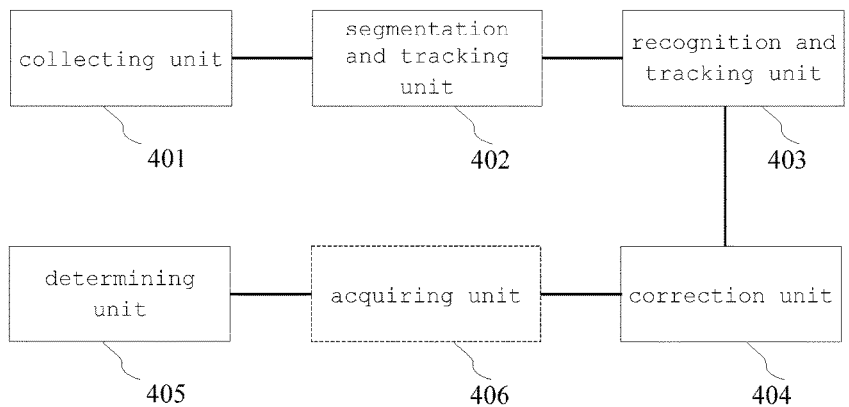
FIG. 4 is a schematic structural diagram of an apparatus for annotating point cloud data according to an embodiment of the present application.

Further, referring to FIG. 4, as an implementation of the methods shown in the above-mentioned figures, the present application provides an embodiment of an apparatus for annotating point cloud data. This apparatus embodiment corresponds to the method embodiment shown in FIG. 2. The apparatus may be specifically applied to various electronic devices.

As shown in FIG. 4, the apparatus 400 for annotating point cloud data according to this embodiment includes: a collecting unit 401, a segmentation and tracking unit 402, a recognition and tracking unit 403, a correction unit 404, and a determining unit 405. The collecting unit 401 is configured to collect data in a given scenario by using a laser radar and a non-laser radar sensor to respectively obtain point cloud data and sensor data. The segmentation and tracking unit 402 is configured to segment and track the point cloud data to obtain point cloud segmentation and tracking results. The recognition and tracking unit 403 is configured to recognize and track feature objects in the sensor data to obtain feature object recognition and tracking results. The correction unit 404 is configured to correct the point cloud segmentation and tracking results by using the feature object recognition and tracking results, to obtain confidence levels of the point cloud recognition and tracking results. The determining unit 405 is configured to determine a point cloud segmentation and tracking result whose confidence level is greater than a confidence level threshold as a point cloud annotation result.

In this embodiment, specific implementations of the collecting unit 401, the segmentation and tracking unit 402, the recognition and tracking unit 403, the correction unit 404, and the determining unit 405 can be referred to step 201, step 202, step 203, step 204, and step 205 in the embodiment corresponding to FIG. 2, and will not be repeatedly described here.

In some alternative implementations of this embodiment, the apparatus 400 further includes: an acquiring unit 406 configured to: acquire a point cloud segmentation and tracking result whose confidence level is greater than the confidence level threshold, for checking by a user; and acquire the checked point cloud segmentation and tracking result in response to a check operation from the user on the point cloud segmentation and tracking result whose confidence level is greater than the confidence level threshold. The determining unit 405 is further configured to: determine the checked point cloud segmentation and tracking result as the point cloud annotation result. Specific implementation of this implementation can be referred to the corresponding step in the embodiment corresponding to FIG. 3, and will not be repeatedly described here.

In some alternative implementations of this embodiment, the collecting unit 401 is further configured to: collect the data in the scenario by using a camera, to obtain a video. Specific implementation of this implementation can be referred to the corresponding implementation in the embodiment corresponding to FIG. 2, and will not be repeatedly described here.

In some alternative implementations of this embodiment, the recognition and tracking unit 403 is further configured to: execute a vehicle registration plate recognizing and tracking algorithm and/or a human face recognizing and tracking algorithm on video content of the video. Specific implementation of this implementation can be referred to the corresponding implementation in the embodiment corresponding to FIG. 2, and will not be repeatedly described here.

In some alternative implementations of this embodiment, the collecting unit 401 is further configured to: collect data by using a laser radar and a sensor placed at the same heights as those mounted on a driverless vehicle. Specific implementation of this implementation can be referred to the corresponding implementation in the embodiment corresponding to FIG. 2, and will not be repeatedly described here.

In some alternative implementations of this embodiment, the collecting unit 401 is further configured to: collect data by using a laser radar and a sensor mounted and calibrated on a driverless vehicle. Specific implementation of this implementation can be referred to the corresponding implementation in the embodiment corresponding to FIG. 2, and will not be repeatedly described here.

Figure 5:
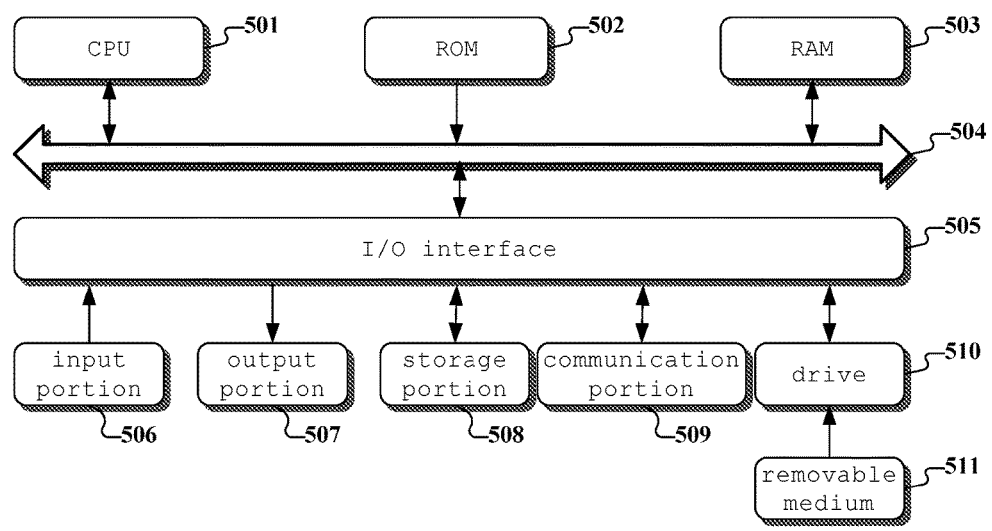
FIG. 5 is a schematic structural diagram of a computer system adapted to implement a terminal device or a server according to an embodiment of the present application.

Referring to FIG. 5, a schematic structural diagram of a computer system 500 adapted to implement a terminal apparatus of the embodiments of the present application is shown.

As shown in FIG. 5, the computer system X00 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a collecting unit, a segmentation and tracking unit, a recognition and tracking unit, a correction unit and a determining unit, where the names of these units or modules are not considered as a limitation to the units or modules. For example, the recognition and tracking unit may also be described as "a unit for recognizing and tracking feature objects in the sensor data to obtain feature object recognition and tracking results".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: collect data in a given scenario by using a laser radar and a non-laser radar sensor to respectively obtain point cloud data and sensor data; segment and track the point cloud data to obtain point cloud segmentation and tracking results; recognize and track feature objects in the sensor data to obtain feature object recognition and tracking results; correct the point cloud segmentation and tracking results by using the feature object recognition and tracking results, to obtain confidence levels of the point cloud recognition and tracking results; and determine a point cloud segmentation and tracking result whose confidence level is greater than a confidence level threshold as a point cloud annotation result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for annotating point cloud data, comprising:
   collecting data in a given scenario by using a laser radar and a non-laser radar sensor to respectively obtain point cloud data and sensor data;
   segmenting and tracking the point cloud data to obtain point cloud segmentation and tracking results;
   recognizing and tracking feature objects in the sensor data to obtain feature object recognition and tracking results;
   matching the point cloud segmentation and tracking results with the feature object recognition and tracking results, to obtain confidence levels of the point cloud segmentation and tracking results;
   acquiring a point cloud segmentation and tracking result having a confidence level greater than a confidence level threshold, for checking by a user;
   acquiring the checked point cloud segmentation and tracking result in response to a user operation on the point cloud segmentation and tracking result having the confidence level greater than the confidence level threshold; and
   determining the checked point cloud segmentation and tracking result as a point cloud annotation result,
   wherein said collecting data in the given scenario by using the laser radar and the non- laser radar sensor to respectively obtain the point cloud data and the sensor data comprises:
      collecting the data in the scenario by using a camera, to obtain a video, and
      wherein said matching the point cloud segmentation and tracking results with the feature object recognition and tracking results, to obtain the confidence levels of the point cloud segmentation and tracking results comprises:
         (i) determining whether a first object and a first movement trajectory of the first object in the point cloud segmentation and tracking results coincide with a second object and a second movement trajectory of the second object in the feature object recognition and tracking results obtained for the video; and (ii) determining a coincidence degree of the first object and the first movement trajectory of the first object in the point cloud segmentation and tracking results with the second object and the second movement trajectory of the second object in the feature object recognition and tracking results obtained for the video; and outputting the determined coincidence degree as the confidence level.

2. The method according to claim 1, wherein the recognizing and tracking feature objects in the sensor data to obtain feature object recognition and tracking results comprises:
executing a vehicle registration plate recognizing and tracking algorithm and/or a human face recognizing and tracking algorithm on video content of the video.

3. The method according to claim 1, wherein the collecting data in a given scenario by using a laser radar and a non-laser radar sensor to respectively obtain point cloud data and sensor data comprises:
collecting data by using a laser radar and a sensor placed at the same heights as those mounted on a driverless vehicle.

4. The method according to claim 1, wherein the collecting data in a given scenario by using a laser radar and a non-laser radar sensor to respectively obtain point cloud data and sensor data comprises:
collecting data by using a laser radar and a sensor mounted and calibrated on a driverless vehicle.

5. An apparatus for annotating point cloud data, comprising:
at least one processor; and
a memory storing instructions, the instructions when executed by the at least one processor, cause the at least one processor to perform operations, the operations comprising:
collecting data in a given scenario by using a laser radar and a non-laser radar sensor to respectively obtain point cloud data and sensor data;
segmenting and tracking the point cloud data to obtain point cloud segmentation and tracking results;
recognizing and tracking feature objects in the sensor data to obtain feature object recognition and tracking results;
matching the point cloud segmentation and tracking results with the feature object recognition and tracking results, to obtain confidence levels of the point cloud segmentation and tracking results;
acquiring a point cloud segmentation and tracking result having a confidence level greater than a confidence level threshold, for checking by a user;
acquiring the checked point cloud segmentation and tracking result in response to a user operation on the point cloud segmentation and tracking result having the confidence level greater than the confidence level threshold; and
determining the checked point cloud segmentation and tracking result as a point cloud annotation result,
wherein said collecting data in the given scenario by using the laser radar and the non-laser radar sensor to respectively obtain the point cloud data and the sensor data comprises:
collecting the data in the scenario by using a camera, to obtain a video, and
wherein said matching the point cloud segmentation and tracking results with the feature object recognition and tracking results, to obtain the confidence levels of the point cloud segmentation and tracking results comprises:
(i) determining whether a first object and a first movement trajectory of the first object in the point cloud segmentation and tracking results coincide with a second object and a second movement trajectory of the second object in the feature object recognition and tracking results obtained for the video; and
(ii) determining a coincidence degree of the first object and the first movement trajectory of the first object in the point cloud segmentation and tracking results with the second object and the second movement trajectory of the second object in the feature object recognition and tracking results obtained for the video; and outputting the determined coincidence degree as the confidence level.

6. The apparatus according to claim 5, wherein the recognizing and tracking feature objects in the sensor data to obtain feature object recognition and tracking results comprises:
executing a vehicle registration plate recognizing and tracking algorithm and/or a human face recognizing and tracking algorithm on video content of the video.

7. The apparatus according to claim 5, wherein the collecting data in a given scenario by using a laser radar and a non-laser radar sensor to respectively obtain point cloud data and sensor data comprises:
collecting data by using a laser radar and a sensor placed at the same heights as those mounted on a driverless vehicle.

8. The apparatus according to claim 5, wherein the collecting data in a given scenario by using a laser radar and a non-laser radar sensor to respectively obtain point cloud data and sensor data comprises:
collecting data by using a laser radar and a sensor mounted and calibrated on a driverless vehicle.

9. A non-transitory computer storage medium storing a computer program, which when executed by a processor, cause the processor to perform operations, the operations comprising:
collecting data in a given scenario by using a laser radar and a non-laser radar sensor to respectively obtain point cloud data and sensor data;
segmenting and tracking the point cloud data to obtain point cloud segmentation and tracking results;
recognizing and tracking feature objects in the sensor data to obtain feature object recognition and tracking results;
matching the point cloud segmentation and tracking results by using the feature object recognition and tracking results, to obtain confidence levels of the point cloud segmentation and tracking results;
acquiring a point cloud segmentation and tracking result having a confidence level greater than a confidence level threshold, for checking by a user;
acquiring the checked point cloud segmentation and tracking result in response to a user operation on the point cloud segmentation and tracking result having the confidence level greater than the confidence level threshold; and
determining the checked point cloud segmentation and tracking result as a point cloud annotation result, wherein said collecting data in the given scenario by using the laser radar and the non-laser radar sensor to respectively obtain the point cloud data and the sensor data comprises:
   collecting the data in the scenario by using a camera, to obtain a video, and
wherein said matching the point cloud segmentation and tracking results with the feature object recognition and tracking results, to obtain the confidence levels of the point cloud segmentation and tracking results comprises:
   (i) determining whether a first object and a first movement trajectory of the first object in the point cloud segmentation and tracking results coincide with a second object and a second movement trajectory of the second object in the feature object recognition and tracking results obtained for the video; and
   (ii) determining a coincidence degree of the first object and the first movement trajectory of the first object in the point cloud segmentation and tracking results with the second object and the second movement trajectory of the second object in the feature object recognition and tracking results obtained for the video, and outputting the determined coincidence degree as the confidence level.

10. The non-transitory computer storage medium according to claim 9, wherein the recognizing and tracking feature objects in the sensor data to obtain feature object recognition and tracking results comprises:
   executing a vehicle registration plate recognizing and tracking algorithm and/or a human face recognizing and tracking algorithm on video content of the video.

11. The non-transitory computer storage medium according to claim 9, wherein the collecting data in a given scenario by using a laser radar and a non-laser radar sensor to respectively obtain point cloud data and sensor data comprises:
   collecting data by using a laser radar and a sensor placed at the same heights as those mounted on a driverless vehicle.

12. The non-transitory computer storage medium according to claim 9, wherein the collecting data in a given scenario by using a laser radar and a non-laser radar sensor to respectively obtain point cloud data and sensor data comprises:
   collecting data by using a laser radar and a sensor mounted and calibrated on a driverless vehicle.

* * * * *